(12) United States Patent
Hirano

(10) Patent No.: US 6,687,827 B1
(45) Date of Patent: Feb. 3, 2004

(54) METHOD OF USING DATA AND DATA PROCESSOR

(75) Inventor: Hideyuki Hirano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/449,561

(22) Filed: Nov. 29, 1999

(30) Foreign Application Priority Data

Dec. 25, 1998 (JP) ............................................ 10-368571

(51) Int. Cl.⁷ ................................................. G06F 11/30
(52) U.S. Cl. ........................ 713/193; 713/200; 713/201
(58) Field of Search ................. 713/193, 200, 713/201

(56) References Cited

FOREIGN PATENT DOCUMENTS

| JP | 5-134863 | 6/1993 |
|----|----------|--------|
| JP | 5-173891 | 7/1993 |
| JP | 10-49986 | 2/1998 |
| JP | 10-283270 | 10/1998 |

*Primary Examiner*—Thomas R. Peeso
(74) *Attorney, Agent, or Firm*—Staas & Halsey LLP

(57) ABSTRACT

A method of using a series of data DT by a data processor is provided. The data are recorded over plural sections that can be managed on a recording medium. The method includes the steps of storing plural kinds of link information LA, LB for designating one or more sections of the data DT that enables the use in the recording medium ST in accordance with license levels, and enabling the use of the link information LA or LB corresponding to the license level that was selected by a user.

19 Claims, 9 Drawing Sheets

Fig. 6

┌─────15────────HG1──────────────────┐
│                                     │
│   DESIGNATE THE DATA YOU WANT TO USE. │
│                                     │
│   ①   DT 1   SAMPLE VERSION   PRODUCT VERSION │
│   ②   DT 2   SAMPLE VERSION   PRODUCT VERSION │
│                                     │
└─────────────────────────────────────┘

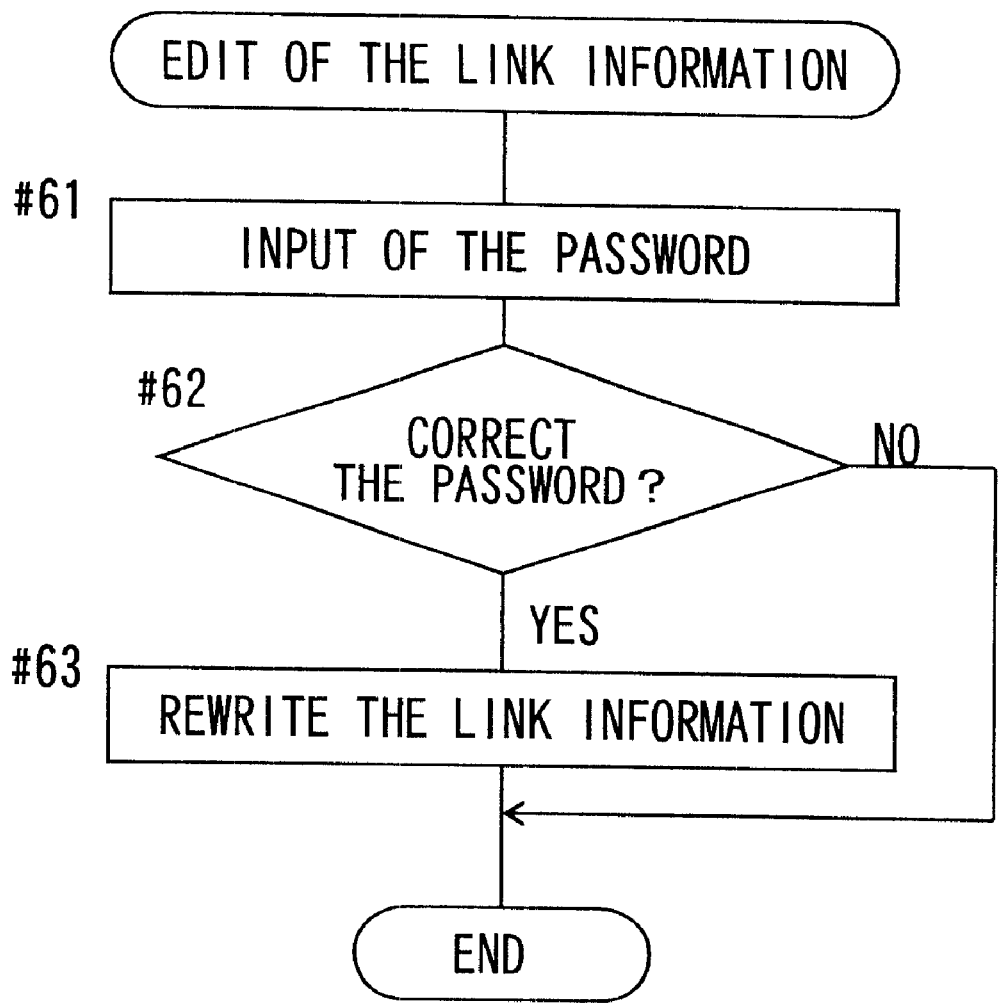

| 0 | 1 | 2 | 3 | 4 | ... | 99 |

| 100 | 101 | 102 | 103 | ...... | 199 |

| 0 | 1 | 2 | 108 | 109 | 110 | ... | 99 | 199 |

METHOD OF USING DATA AND DATA PROCESSOR

BACKGROUND OF THE INVENTION

1. Field of the Invention

The present invention relates to a method of using data, mainly content data such as image data, sound data, or text data, a data processor, and a computer usable medium.

In order to prevent copycat or piracy of computer program or content data recorded on a recording medium such as a CD-ROM, and to promote correct use, a various cryptographic keys are used to scramble the data. Since data quantity is increasing rapidly along with development of multimedia, it is important to perform the scrambling process efficiently so as to promote correct use.

2. Description of the Prior Art

Conventionally, a cryptographic key has been used to scramble data for correct use of the data that are, e.g., programs or content data, supplied by the recording medium such as a CD-ROM. The cryptographic key for descrambling is sent from a data provider to a user who requested to use the data, via telephone or communication, for example. In this case, the data provider performs a process for charging the user, if necessary.

It is often performed to record two kinds of data, a sample version (or a demo version) and a product version, on one recording medium for providing them. In this case, the provider may scramble the product version, but not scramble the sample version, when recording. The user can use the sample version freely, but have to get the cryptographic key for descrambling at some cost so as to use the product version.

The conventional method has a disadvantage in that data quantity is increased since two kinds of data are recorded overlapping, the sample version without being scrambled and the product version with being scrambled. Therefore, quantity of contents or programs that can be recorded on the recording medium becomes small, resulting in high cost.

In addition, if not only the simple two kinds of license levels including the sample version and the product version, but more kinds of license levels are used for providing data, the quantity of data may increase more since each kind of data should be recorded.

SUMMARY OF THE INVENTION

The object of the present invention is to enable restricting the use of data in accordance with plural license levels without increasing the quantity of data as the conventional method, and to promote of correct use of the data.

According to a first aspect of the present invention, a method of using data by a data processor is provided. As shown in FIGS. 1–6, a series of data DT is recorded over plural sections BK that can be managed on the recording medium ST. The method includes the steps of storing plural kinds of link information L for designating one or more sections BK of the data DT that enables the use in the recording medium ST in accordance with license levels, and enabling the use of the link information L corresponding to the license level that was selected by a user.

According to a second aspect of the present invention, the method further includes the step of enabling the use of the link information L corresponding to the license level that was selected by a user, and enabling a provider of the data DT to do charge process in accordance with the license level.

According to a third aspect of the present invention, the data DT recorded on the recording medium ST is scrambled by a first cryptographic key K1.

According to a fourth aspect of the present invention, there are provided two license levels which are the licensed and non-licensed, and the link information LA corresponding to the licensed is scrambled by a second cryptographic key K2.

According to a fifth aspect of the present invention, the second cryptographic key K2 is recorded on the recording medium ST, and the use of the second cryptographic key K2 is permitted when the correct password is input to the data processor.

According to a sixth aspect of the present invention, an application program AP1 recorded on the recording medium ST controls so as to output the contents of the data DT recorded on the section BK designated by the selected link information L from the data processor when the correct user ID is input to the data processor.

According to a seventh aspect of the present invention, another method of using data by a data processor is provided. Series of data DT are scrambled by a first cryptographic key K1 and are recorded over plural sections BK that can be managed on the recording medium ST. The method includes the steps of storing plural kinds of link information L for designating one or more sections BK of the data DT that enables the use in the recording medium ST in accordance with license levels, performing charge process to a user in accordance with the license level selected by the user, permitting the user to get the first cryptographic key K1 so that the data processor can decode the data DT, and outputting the contents of the data DT from the data processor using the link information L corresponding to the selected license level.

According to an eighth aspect of the present invention, a data processor is provided for using a series of data DT recorded over plural sections BK that can be managed on a recording medium ST. The data processor includes link information storage means 10a for storing the link information L for designating one or more sections BK of the data DT that enables the use, selection input means 13, 14 for selecting a license level, and means for outputting the contents of the data DT using the link information L corresponding to the selected license level.

According to a ninth aspect of the present invention, a recording medium is provided, on which a series of data DT is recorded over plural sections BK that can be managed so that the data processor can use the data. The recording medium stores plural kinds of link information L for designating one or more sections BK of the data DT that enables the use, in accordance with license levels.

According to a tenth aspect of the present invention, a computer usable medium is provided. On the computer usable medium, a series of data is recorded over plural sections BK that can be managed so that the data processor can use the data. The computer usable medium stores plural kinds of link information L for designating one or more sections BK of the data DT that enables the use in accordance with license levels, a display control program AP1 for displaying a selection input picture HG1 used for selecting a license level, and an output processing program AP1 for outputting the contents of the data DT using the link information L corresponding to the selected license level.

BRIEF DESCRIPTION OF THE DRAWINGS

FIG. 6 shows an example of an initial menu displayed on the screen when using the recording medium.

FIG. 10 is a flowchart of the process for rewriting the link information L of the recording medium.

FIGS. 11A–11C show an example of the link information LE using the address information over the plural content data.

DESCRIPTION OF THE PREFERRED EMBODIMENTS

Hereinafter, the present invention will be explained more in detail with reference to embodiments and drawings.

Figure 1:
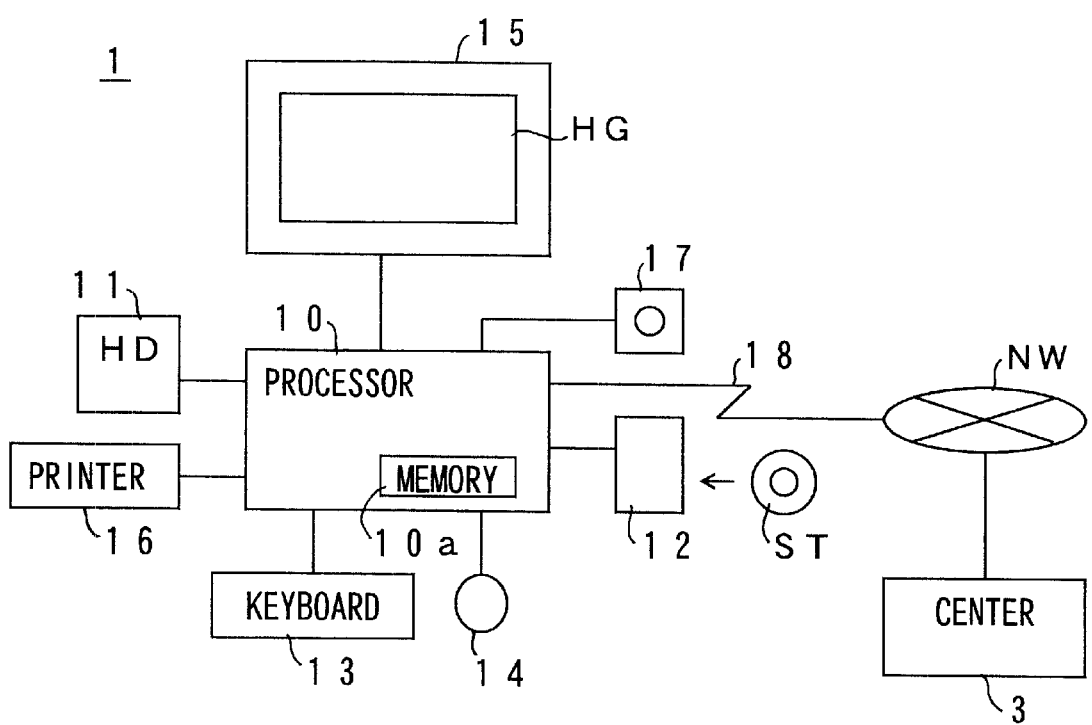
FIG. 1 is a block diagram of a data processor according to the present invention.
Figure 2:
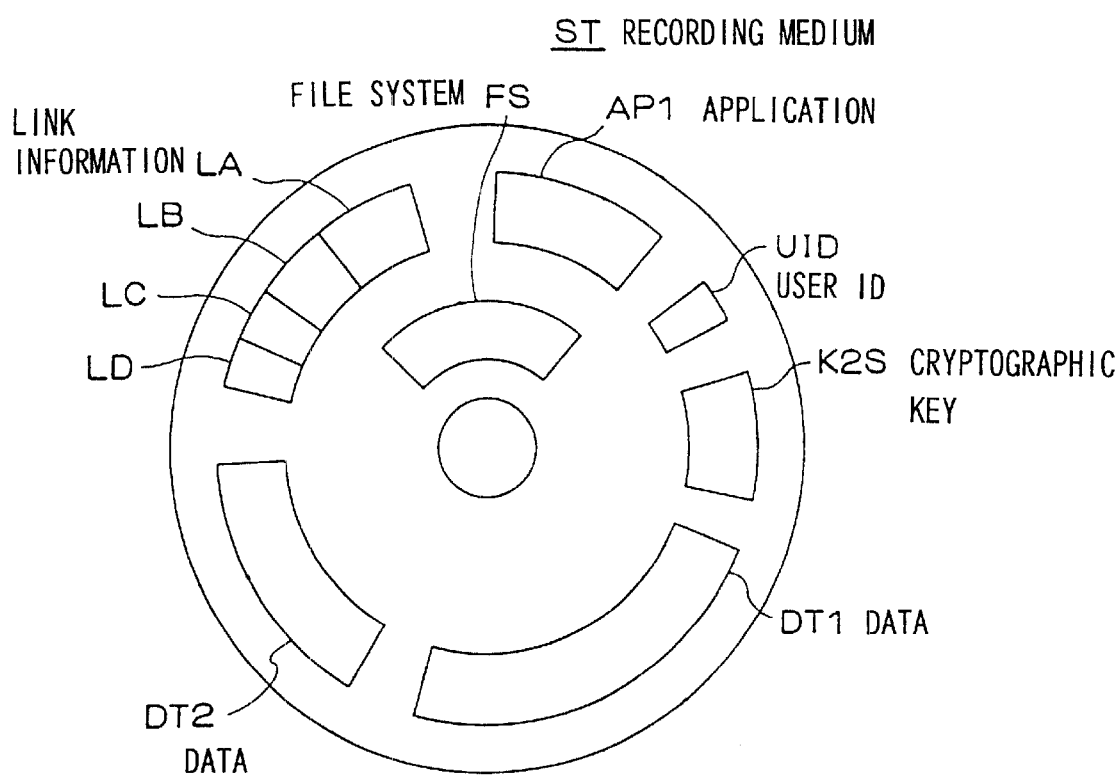
FIG. 2 shows an example of data recorded on the recording medium.
Figure 3:
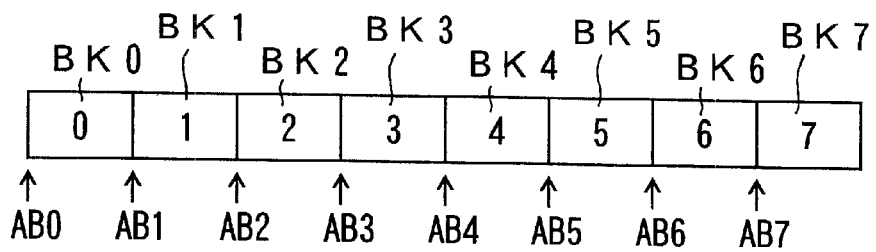
FIG. 3 shows an example of recorded state of content data.
Figure 4A:
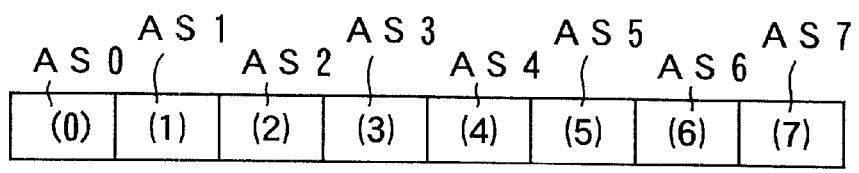
FIGS. 4A and 4B show an example of recorded state of a link region LA.
Figure 4B:
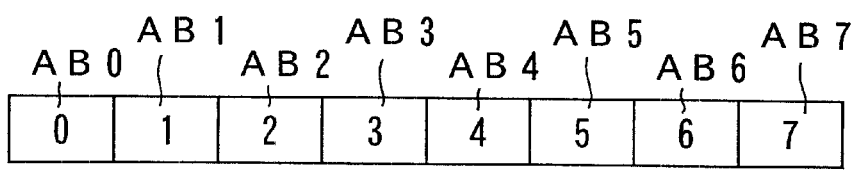
Figure 5:
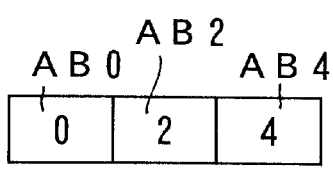
FIG. 5 shows an example of recorded state of a link region LB.

FIG. 1 is a block diagram of a data processor 1 according to the present invention. FIG. 2 shows an example of data recorded on the recording medium ST. FIG. 3 shows an example of recorded state of content data DT1. FIGS. 4A and 4B show an example of recorded state of a link region LA. FIG. 5 shows an example of recorded state of link region LB. FIG. 6 shows an example of an initial menu view HG1 displayed on a screen HG when using the recording medium ST.

In FIG. 1, the data processor 1 includes a processor 10, a hard disk drive 11, a media drive 12, a keyboard 13, a mouse 14, a display 15, a printer 16 and a speaker 17.

The hard disk drive 11 stores various data and programs beforehand, and stores the contents of the recording medium ST that is read by the media drive 12. The media drive 12 can read and write data from and to the recording medium ST that is set to the media drive 12. The recording medium ST includes a CD-ROM, an MO, a DVD, a flexible disk, a compact flash memory and other various computer usable media, and the media drive 12 corresponding to the medium ST is used.

The keyboard 13 and the mouse 14 are operated by the user for inputting various kinds of data such as an ID code (an identification code), a password, a cryptographic key or commands.

The screen HG of the display 15 displays various data or images such as an initial menu picture HG1 for using the recording medium ST, an entry picture for inputting the ID code, the password or the cryptographic key manually, or an image of content data recorded on the recording medium ST. The printer 16 can print various contents of picture displayed on the display 15 and other data or images. The speaker 17 can output various sounds.

The processor 10 includes a CPU, a memory including a RAM and a ROM, other peripheral devices, and a communication controller such as a MODEM. The processor 10 instructs the media drive 12 to read the contents of the recording medium ST when the recording medium ST is set to the media drive 12. The read data such as the content data DT, the link information L, a file system FS, and the received password and first cryptographic key K1 are memorized in a memory 10a. The processor 10 performs various processes in accordance with a program recorded on the recording medium ST, or a program read from the record and memorized in the hard disk drive 11 or the memory, and outputs the result to the display 15, the speaker 17 or the external portion such as a center 3. The processor 10 is connected to a network NW via a circuit 18, so as to communicate the center 3.

In FIG. 2, the recording medium ST stores content data DT1, DT2, , an application AP1, a file system FS, link information LA, LB, LC, , a user ID (UID) and a cryptographic key K2S.

The content data DT1, DT2 are, for example, image data such as a movie (a motion picture) or a still frame, or sound data such as a music, a recitation or natural sounds. It can be a database or a program. Each of the content data DT1, DT2 is recorded over plural sections e.g., plural sectors that can be managed on the recording medium ST. It can be recorded over plural volumes. In this embodiment, the content data DT1 is encoded by the first cryptographic key K1.

The application AP1 is a program for using the content data DT1, DT2. When starting the use of the recording medium ST, the application AP1 is launched at first, and the initial menu picture HG1 for using the recording medium ST shown in FIG. 6 is displayed on the screen HG of the display 15.

The file system FS is a mechanism for managing recorded states of the content data DT and the application AP1. Each of the data such as the content data DT is recorded over plural sectors, and the file system FS manages which data are recorded on which sector or which address. Only a required data can be extracted from long data by combining the address information managed by the file system FS.

As shown in FIG. 3, the content data DT1 are recorded over the sectors BK0–BK7 represented by numerals "0" to "7". Starting addresses AB0–AB7 for accessing the sectors BK0–BK7 are managed by the file system FS. The content data DT2 are recorded on the sector BK after "8". In this embodiment, the application AP1 uses address information recorded as the link information L for using the content data DT1. Namely, the data recorded on the sectors BK designated by the address information can be read sequentially using the address information recorded as the link information LA.

The link information LA, LB, LC, are information for designating one or more sectors BK that enables the user to use the content data DT. One or more link information L is provided for one of the content data DT. If there are plural link information L, they are provided corresponding to the license levels.

In this embodiment, two link information LA, LB are provided for the content data DT1. The link information LA corresponds to the license level for the product version, while the link information LB corresponds to the license level of the sample version. The link information LA is encrypted by the second cryptographic key K2. The link information LB is not encrypted.

As shown in FIG. 4A, the link information LA is encrypted address information that enables reading out all of the content data DT1. Namely, the link information LA includes the information AS0–AS7 generated by encrypting the addresses AB0–AB7 for accessing the sectors BK0–BK7 of the content data DT1. Encrypting the link information LA by the second cryptographic key K2 generates the link information LAR shown in FIG. 4B. Therefore, the encrypted link information LAR is used for reading out the product version of the content data DT1.

As shown in FIG. 5, link information LB is address information that enables reading out a part of the content data DT1 sequentially. In this embodiment, the link information LB is address information AB0, AB2, AB4 for reading out the sectors BK, "0", "2", "4" of the content data DT1.

In this embodiment, the link information LB is made of the address information AB0, AB2, AB4. However, it can be the address information AB for reading out the other sector BK. Alternatively, the address information AB made of a combination of other various sectors BK can be provided as link information L corresponding to the license level. In this case, the link information L can be encrypted by the second cryptographic key K2 or the other cryptographic key K in accordance with the presence or absence of charging. The link information L can be constituted as a part of the file system FS.

The user ID is uniquely assigned to the recording medium ST or the content data DT. The user ID is used for obtaining the password and the first cryptographic key K1 by communication with the center 3.

The cryptographic key K2S is generated by encrypting the second cryptographic key K2 by the password, and becomes the second cryptographic key K2 by decrypting by the password. The second cryptographic key K2 is, as mentioned above, used for decrypting the link information LA.

Various known methods can be used for obtaining the password and the first cryptographic key K1. For example, the data processor 1 transmits the user ID and the license level selected by the user to the center 3 by communication, and responding to the transmission the center 3 transmits the password and the first cryptographic key K1 to the data processor 1. A content ID can be transmitted simultaneously. When the center 3 performs the transmission, the center 3 performs the process charging the user in accordance with the license level selected by the user. The charging process includes, for example, checking off from prepayment, checking off from a cash card and checking off via a credit card.

Next, a method of making the recording medium ST and a method of using the content data DT1 will be explained with reference to a flowchart.

Figure 7:
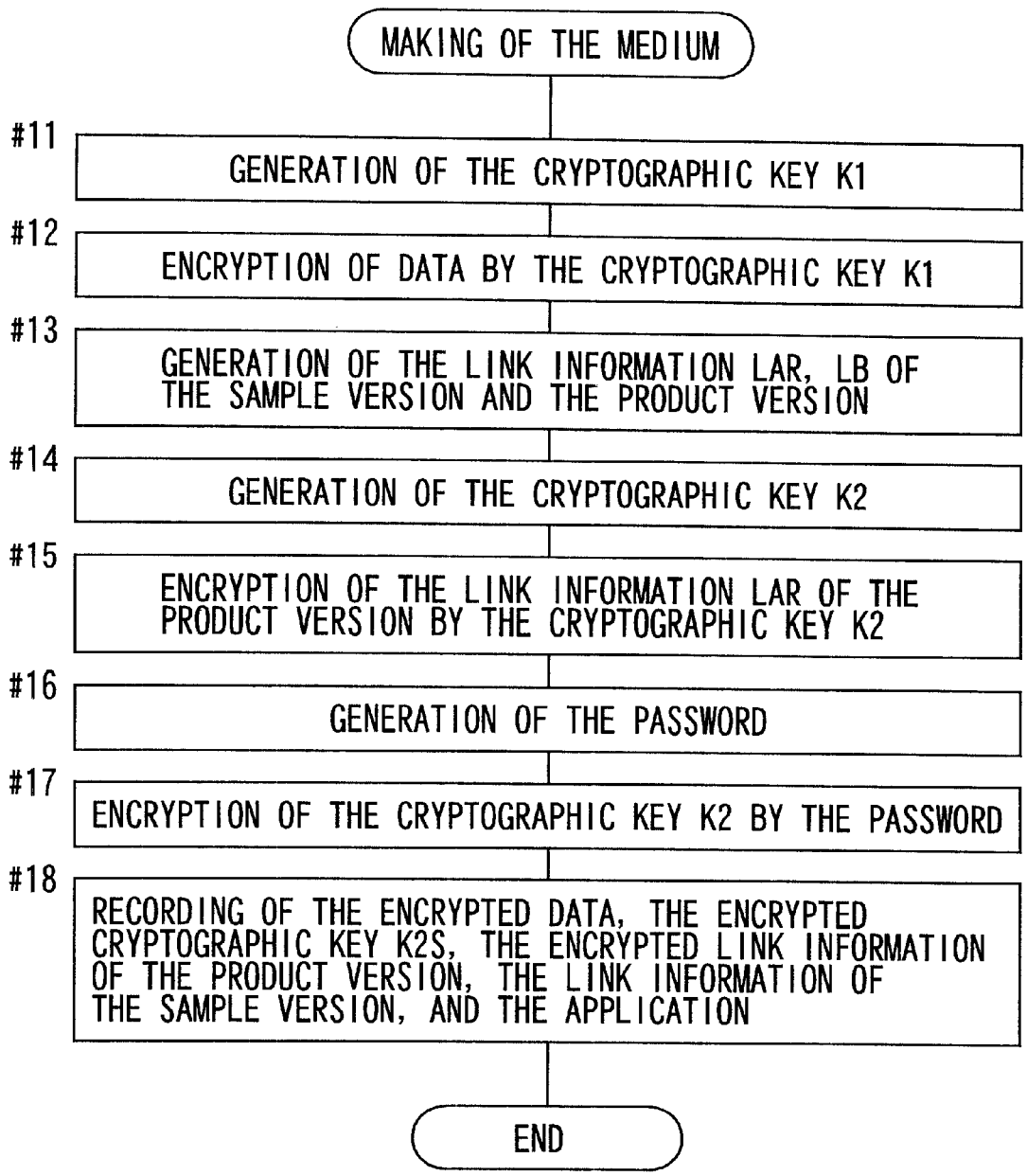
FIG. 7 is a flowchart of the process for making the recording medium.
Figure 8:
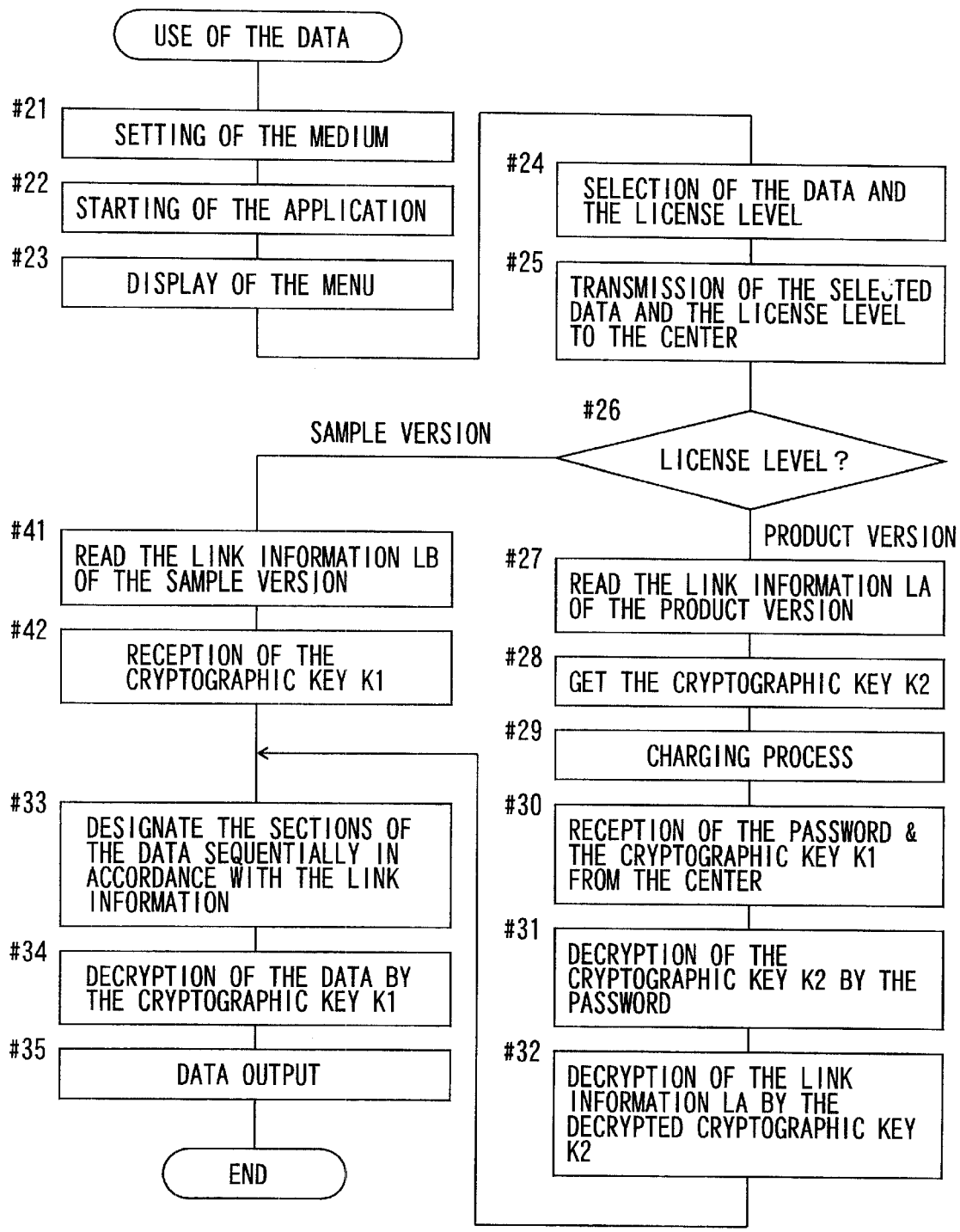
FIG. 8 is a flowchart of the process for using the recording medium.
Figure 9:
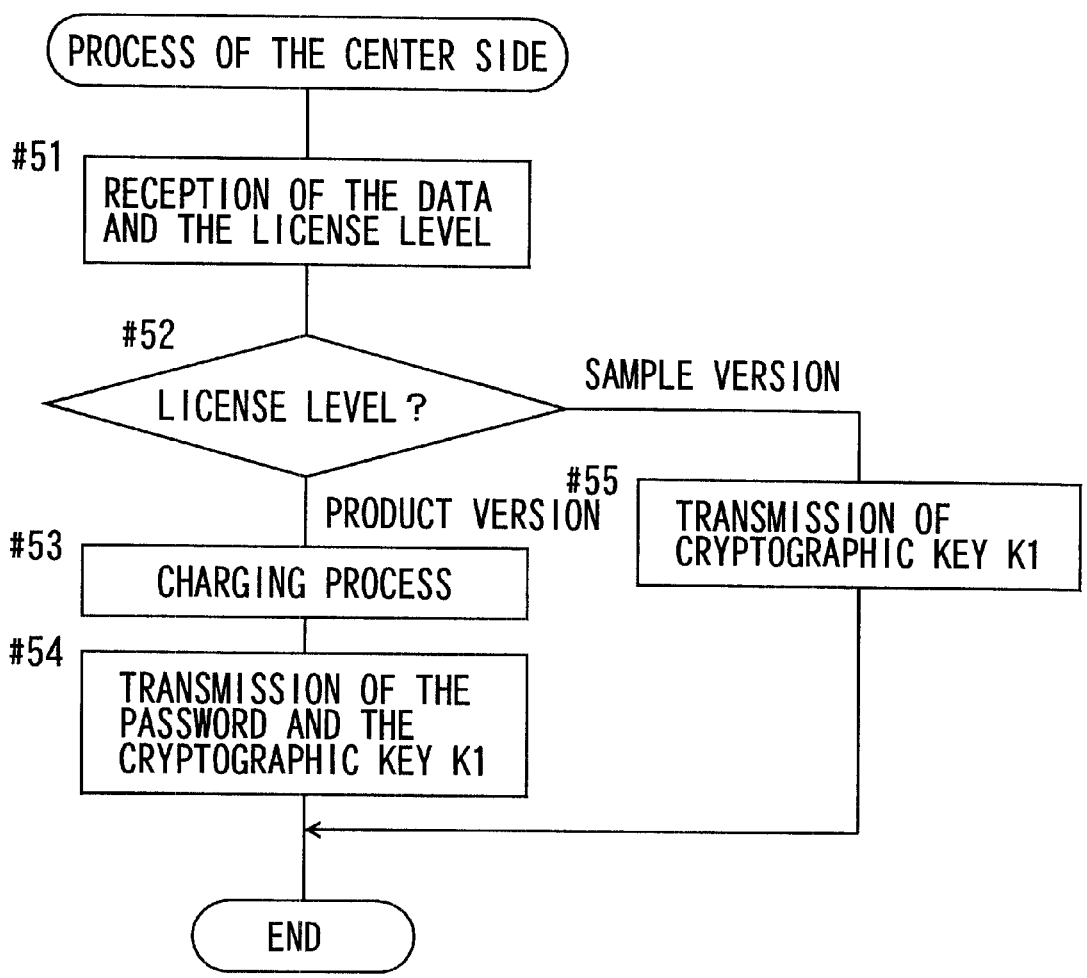
FIG. 9 is a flowchart of the process performed by the center when using the recording medium.

FIG. 7 is a flowchart of the process for making the recording medium ST. FIG. 8 is a flowchart of the process for using the recording medium ST. FIG. 9 is a flowchart of the process performed by the center 3 when using the recording medium ST.

In FIG. 7, the first cryptographic key K1 for encrypting (scrambling) the content data DT when manufacturing the recording medium ST is generated (Step #11). Using the first cryptographic key K1, the content data DT are encrypted (Step #12). The link information LAR, LB for the sample version and the product version are generated (Step #13). The second cryptographic key K2 is generated (Step #14). Using the second cryptographic key K2, the link information LAR is encrypted, and the link information LA is generated (Step #15). The password is generated (Step #16), and the second cryptographic key K2 is encrypted by the password so as to generate the cryptographic key K2S (Step #17).

Various known methods can be used for encrypting. For example, when encrypting the link information LAR, one byte of the second cryptographic key K2 is generated, an exclusive OR (XOR) of each byte data of the link information LAR and the second cryptographic key K2 is operated, and the result data become the link information LA.

The encrypted data of the content data DT, the cryptographic key K2S, the link information LA, LB and the application AP1 are recorded on the recording medium ST (Step #18).

In FIG. 8, the user who bought the recording medium ST, sets the recording medium ST to the media drive 12 of the data processor 1 (Step #21), and starts the application AP1 (Step #22). Thus, the initial menu picture HG1 shown in FIG. 6 is displayed on the screen HG (Step #23).

The menu displayed on the screen includes the kind of the contents and a selection button for selecting the sample version or the product version. In this picture HG1, either the sample version or the product version is selected (Step #24), and then the identification code of the selected contents, the user ID and the license level according to the sample version or the product version are transmitted to the center 3 (Step #25). In accordance with the license level, the process branches (Step #26).

If the product version is selected, the link information LA and the second cryptographic key K2 recorded on the recording medium ST is retrieved (Step #27,28). The process for the user to pay for the product version is performed (Step #29). This process is performed by the center 3 as a charging process, for example.

The password and the first cryptographic key K1 is obtained from the center 3 (Step #30), and the cryptographic key K2S is decrypted by the password to generate the second cryptographic key K2 (Step #31). Using the second cryptographic key K2, the link information LA is decrypted so as to obtain the encrypted link information LAR (Step #32).

On the basis of the link information LA, the sectors recording the content data DT1 are designated sequentially to read the data (Step #33). The read-out data is decrypted by the first cryptographic key K1 (Step #34). The decrypted data is output (Step #35). Namely, if the data are image data or text data, the image or the text is displayed on the screen HG, while if the data are sound data, the speaker 17 outputs the sound.

If the sample version is selected, the link information LB recorded on the recording medium ST is retrieved (Step #41), and the first cryptographic key K1 is obtained from the center 3 (Step #42). The charging process is not performed for the sample version by the center 3. After that, the sectors of the content data DT1 are designated and are read sequentially in accordance with the link information LB (Step #33). The read data are decrypted by the first cryptographic key K1 (Step #34) and are output (Step #35).

In FIG. 9, the center 3 receives the data such as the user ID and the license level (Step #51), and performs the process in accordance with the license level. For the product version, the process of charging the user is performed (Step #53), and the password and the first cryptographic key K1 are sent to the user (Step #54). For the sample version, the first cryptographic key K1 is sent to the user (Step #55).

Thus, the link information LA, LB corresponding to various license levels are recorded on the recording medium ST, and the application AP1 read the content data DT1 in accordance with the link information LA or LB, so only one of data for one of content data DT1 should be recorded on the recording medium ST. Therefore, overlapping record of the content data as the conventional method is not required, so that the data quantity can be decreased. In addition, since many link information L can be recorded corresponding to various license levels, it is easy to support various applications. Therefore, the data quantity is not so increased as the conventional method. The use of the data can be restricted or promoted in accordance with the plural license levels by small data quantity, so that the correct use of the data can be promoted.

Especially, the above-mentioned content data DT1 are seamless over the whole data, only the desired part can be retrieved by selection. Namely, only the data recorded on each sector can be retrieved so as to output them as an image or a sound having a certain sense. The program that is not content data can be meaningless if it is divided. Therefore, the section should be managed so that the closed program or data having a process function such as a subroutine is not mixed with other program or data.

In addition, the link information LA is scrambled, while the link information LB is not scrambled. Thus, the presence or absence of the scramble, or the cryptographic key for descramble can be different in accordance with the license level. Namely, the conventional method can only select scrambled or not scrambled for the whole content data, while the embodiment of the present invention can scramble any part of the content data. Furthermore, the information of the section such as a sector of the link information L can be either continuous or intermittent.

In addition, it is possible that the user can rewrite the link information L of the recording medium ST.

FIG. 10 is a flowchart of the process for rewriting the link information of the recording medium ST.

In FIG. 10, the user inputs the password for rewriting (Step #61), when the processor 10 checks whether the password is correct or not (Step #62). If the password is correct, the user can rewrite the link information L (Step #63). Another method is possible, in which the link information L is not rewritten, but the contents of the content data can be rewritten. The password can be obtained from the center, for example.

The link information L can be address information over plural content data instead of one content data DT1.

FIGS. 11A–11C show an example of the link information LE using the address information over plural content data.

As shown in FIG. 11A, sound data DT2W are recorded on the sectors "0" to "99" of the recording medium ST1. As shown in FIG. 11B, image data DT2V are recorded on the sectors ("100" to "199". As shown in FIG. 11C, for link information LE, the sound data DT2W on the sectors 0, 1, 2 are designated, then the image data DT2V on the sectors 108, 109, 110 are designated, and finally the sound data DT2W on the sectors 99 and the image data DT2V on the sector 199 are designated.

Thus, the link information LE can be constituted so that the sound data DT2W and the image data DT2V are mixed and are output sequentially.

In the above-mentioned embodiment, the link information LA is scrambled, while the link information LB is not scrambled. However, the link information LB also can be scrambled. Though the first cryptographic key K1 and the password are obtained from the center 3 by communication, they can be obtained by other means such as telephone, facsimile, or mail. Instead of obtaining from the center 3, they can be recorded on the recording medium ST by an appropriate method.

In the above-mentioned embodiment, the kind of the recording medium ST, the method of recording and the kind, the number or the contents of information or data to be recorded can be changed variously. The contents, the name and the obtaining route of the cryptographic key, the password, the user ID and the content ID can be changed if necessary. In addition, the configuration of the whole or a part of the data processor 1, and the contents or the order of the process performed by the data processor 1 can be changed within the scope of the present invention if necessary.

What is claimed is:

1. A method of using a series of data by a data processor, the data being recorded over plural sections that can be managed on a recording medium, the method comprising the steps of:

storing plural kinds of link information for designating one or more sections of the data that enables the use in the recording medium in accordance with license levels; and enabling the use of the link information corresponding to the license level that was selected by a user.

2. A method of using a series of data by a data processor, the data being recorded over plural sections that can be managed on a recording medium, the method comprising the steps of:

storing plural kinds of link information for designating one or more sections of the data that enables the use in the recording medium in accordance with license levels;

enabling the use of the link information corresponding to the license level that was selected by a user; and enabling a provider of the data to do a charging process in accordance with the license level.

3. The method according to claim 2, wherein the data recorded on the recording medium is scrambled by a first cryptographic key.

4. The method according to claim 3, wherein the license levels include two license levels which are the licensed and non-licensed, and the link information corresponding to the licensed is scrambled by a second cryptographic key.

5. The method according to claim 4 wherein the second cryptographic key is recorded on the recording medium, and the use of the second cryptographic key is permitted when the correct password is input to the data processor.

6. The method according to claim 5, wherein an application program recorded on the recording medium controls so as to output the contents of the data recorded on the section designated by the selected link information from the data processor when the correct user ID is input to the data processor.

7. A method of using a series of data by a data processor, the data being scrambled by a first cryptographic key and recorded over plural sections that can be managed on a recording medium, the method comprising the steps of:

storing plural kinds of link information for designating one or more sections of the data that enables the use in the recording medium in accordance with license levels;

performing a charging process to a user in accordance with the license level selected by the user;

permitting the user to get the first cryptographic key so that the data processor can decode the data; and outputting the contents of the data from the data processor using the link information corresponding to the selected license level.

8. The method according to claim 7, wherein the license levels include two license levels which are the licensed and non-licensed, and the link information corresponding to the licensed is scrambled by a second cryptographic key.

9. The method according to claim 8, wherein the second cryptographic key is recorded on the recording medium, and the use of the second cryptographic key is permitted when the correct password is input to the data processor.

10. The method according to claim 9, wherein the contents of the data can be output only when the correct user ID is input to the data processor.

11. A data processor for using a series of data recorded over plural sections that can be managed on a recording medium, the data processor comprising:
  link information storage means for storing the link information for designating one or more sections of the data that enables the use;
  selection input means for selecting a license level; and
  means for outputting the contents of the data using the link information corresponding to the selected license level.

12. The data processor according to claim 11, wherein the data recorded on the recording medium is scrambled by a first cryptographic key, charging to the user is performed in accordance with the selected license, and the data processor can decode the data using the first cryptographic key obtained by the user.

13. The data processor according to claim 11, wherein the license levels include two license levels which are the licensed and non-licensed, and the link information corresponding to the licensed is scrambled by a second cryptographic key.

14. The data processor according to claim 13, wherein the second cryptographic key is recorded on the recording medium, and the use of the second cryptographic key is permitted when the correct password is input to the data processor.

15. The data processor according to claim 14, wherein the contents of the data can be output only when the correct user ID is input to the data processor.

16. A recording medium on which a series of data is recorded over plural sections that can be managed so that the data processor can use the data, wherein the recording medium stores plural kinds of link information for designating one or more sections of the data that enables the use, in accordance with license levels.

17. The recording medium according to claim 16, wherein the data is scrambled by a first cryptographic key and is recorded.

18. The recording medium according to claim 17, wherein the license levels include two license levels which are the licensed and non-licensed, and the link information corresponding to the licensed is scrambled by a second cryptographic key.

19. A computer usable medium, on which a series of data is recorded over plural sections that can be managed so that the data processor can use the data, wherein the computer usable medium stores plural kinds of link information for designating one or more sections of the data that enables the use in accordance with license levels, a display control program for displaying a selection input picture used for selecting a license level, and an output processing program for outputting the contents of the data using the link information corresponding to the selected license level.

* * * * *